(12) United States Patent
Sawatsky (10) Patent No.: US 12,234,877 B2
(45) Date of Patent: Feb. 25, 2025

(54) APPARATUSES AND METHODS FOR REDUCING VIBRATION OF 3D PRINTERS

(71) Applicant: Ashley Sawatsky, Plum Coulee (CA)

(72) Inventor: Ashley Sawatsky, Plum Coulee (CA)

( * ) Notice: Subject to any disclaimer, the term of this patent is extended or adjusted under 35 U.S.C. 154(b) by 665 days.

(21) Appl. No.: 17/400,372

(22) Filed: Aug. 12, 2021

(65) Prior Publication Data

US 2023/0052751 A1 Feb. 16, 2023

(51) Int. Cl.
*F16F 15/02* (2006.01)
*B29C 64/25* (2017.01)
*B33Y 30/00* (2015.01)

(52) U.S. Cl.
CPC .............. *F16F 15/02* (2013.01); *B29C 64/25* (2017.08); *B33Y 30/00* (2014.12)

(58) Field of Classification Search
None
See application file for complete search history.

(56) References Cited

U.S. PATENT DOCUMENTS

| | | | | |
|---|---|---|---|---|
| 3,204,911 A * | 9/1965 | Lawrence | ................ | F16F 7/14 |
| | | | | 267/148 |
| 6,371,434 B1 * | 4/2002 | Becker | .................... | F16F 15/04 |
| | | | | 267/166.1 |
| 6,477,042 B1 * | 11/2002 | Allgeyer | ................ | G11B 33/08 |
| | | | | 360/99.18 |
| 7,487,958 B2 * | 2/2009 | Wang | ...................... | B01F 29/10 |
| | | | | 366/217 |
| 10,018,243 B1 * | 7/2018 | Gilbert | ...................... | F16F 3/08 |
| 2011/0095164 A1 * | 4/2011 | Chang | .................... | G06F 1/182 |
| | | | | 248/565 |
| 2015/0053841 A1 * | 2/2015 | Terajima | .................. | G02B 7/08 |
| | | | | 248/638 |

FOREIGN PATENT DOCUMENTS

| CN | 207190272 U | * | 4/2018 | |
|---|---|---|---|---|
| CN | 108919197 A | * | 11/2018 | ............. G01S 7/032 |
| CN | 208529746 U | * | 2/2019 | |

* cited by examiner

*Primary Examiner* — Melanie Torres Williams
(74) *Attorney, Agent, or Firm* — Kyle R Satterthwaite; Ryan W Dupuis; Ade & Company Inc.

(57) ABSTRACT

A stabilization apparatus for reducing vibration of a 3D printer during operation thereof. A stabilization apparatus features a stationary framework having a base seated atop a support surface and spanning a greater two-dimensional footprint than the 3D printer. One or more flexible elongated suspenders each has one end connected to a respective anchor point each defined on the supportive framework at a respective location of elevated relation to an underside of the base. Another end of each suspender is secured either to the 3D printer itself, or to a floating support atop which the 3D printer is placed. The 3D printer is thereby supported in a floating position of suspended relation to the stationary framework of the stabilization apparatus.

20 Claims, 6 Drawing Sheets

APPARATUSES AND METHODS FOR REDUCING VIBRATION OF 3D PRINTERS

FIELD OF THE INVENTION

The present invention relates generally to 3D printers, and more particularly to solutions for reduction vibration of such printers during operation thereof.

BACKGROUND

In the field of 3D printing, issues of excessive noise and vibration associated with the operation of 3D printers have led to the design of various vibrational isolators designed for use in an undermounted relation to the printer, i.e. vibration-damping feet or blocks atop which the printer itself is directly seated, or atop which an intermediary platform is placed to accommodate seated placement of the printer atop the vibrationally isolated platform.

Regardless, there remains room for improved and alternative solutions for reducing vibrational movement of 3D printers, and Applicant has developed novel and inventive solutions, the details of which are set forth herein in the following description and accompanying figures.

SUMMARY OF THE INVENTION

According to one aspect of the invention, a 3D printer and a stabilization apparatus are provided in combination for reducing vibration of said 3D printer during operation thereof atop a support surface, wherein said stabilization apparatus comprises:

a stationary framework comprising a base placeable in a working position atop said support surface and having a greater two-dimensional footprint than said 3D printer, whereby, in said position, an outer perimeter of said base of the stabilization apparatus resides in surrounding relation around the two-dimensional footprint of said 3D printer; and one or more flexible suspenders each having an elongated shape between longitudinally opposing first and second ends thereof; and one or more anchor points each defined on the supportive framework at a respective location of elevated relation to an underside of the base, each of said one or more anchor points holding, or being configured for selective holding of, the first end of a respective one of the one or more flexible members to thereby anchor said respective one of the one or more flexible members to the supportive framework;

wherein the second end of each of said one or more flexible suspenders is either secured, or selectively securable, either to the 3D printer, or to a floating support of the stabilization apparatus, atop which the 3D printer is placed or placeable, whereby the 3D printer is supported or supportable in suspended relation to the stationary framework of the stabilization apparatus by said one or more flexible suspenders.

According to another aspect of the invention, there is provided stabilization apparatus for reducing vibration of a 3D printer during operation thereof atop a support surface, wherein said stabilization apparatus comprises:

a stationary framework comprising a base placeable in a working position seated atop said support surface and spanning a greater two-dimensional footprint than said 3D printer, whereby, in said working position, an outer perimeter of said base of the stabilization apparatus resides in surrounding relation around the two-dimensional footprint of said 3D printer; and one or more flexible suspenders each having an elongated shape between longitudinally opposing first and second ends thereof; and one or more anchor points each defined on the supportive framework at a respective location of elevated relation to an underside of the base, each of said one or more anchor points holding, or being configured for selective holding of, the first end of a respective one of the one or more flexible members to thereby anchor said respective one of the one or more flexible members to the supportive framework;

wherein the second end of each of said one or more flexible suspenders is either secured, or selectively securable, either to the 3D printer, or to a floating support of the stabilization apparatus, atop which the 3D printer is placed or placeable, whereby the 3D printer is supported or supportable in suspended relation to the stationary framework of the stabilization apparatus by said one or more flexible suspenders.

According to yet another aspect of the invention, there is provided a method of reducing vibration of a 3D printer during operation thereof, said method comprising suspending said 3D printer in a floating position using one or more flexible suspenders each having a first end secured to a stationary anchor point on a structure that is separate and distinct of said 3D printer, and a second end secured either to the 3D printer, or to a floating support on which said 3D printer is placed.

BRIEF DESCRIPTION OF THE DRAWINGS

Preferred embodiments of the invention will now be described in conjunction with the accompanying drawings in which.

DETAILED DESCRIPTION

Figure 1:
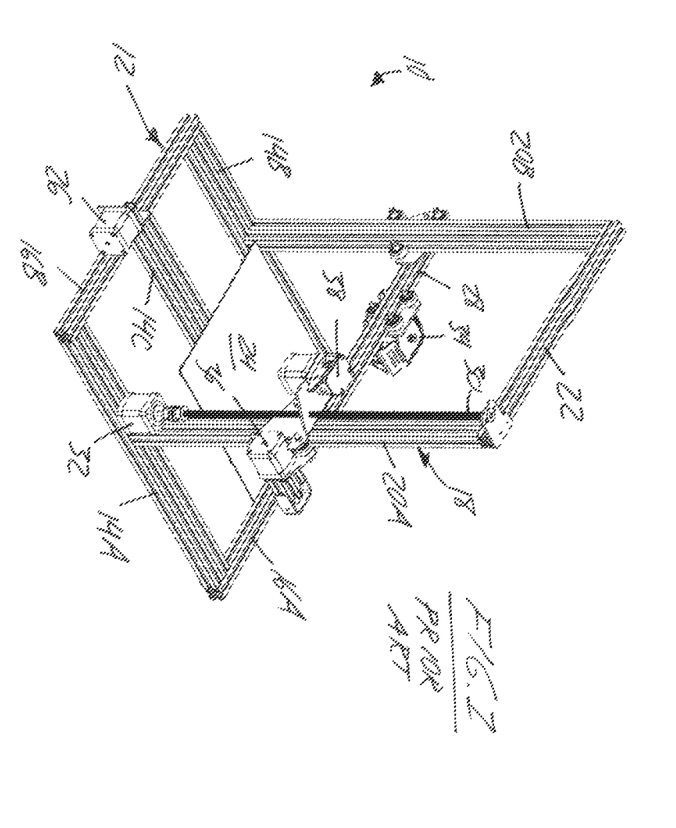
FIG. 1 is an isolated rear perspective view of a conventional 3D printer of the prior art, presented for context as a non-limiting example of a 3D printer to which the teachings of the present application may be applied.

FIG. 1 shows an example of a 3D printer 10 to which the inventive aspects of the present invention may be applied to reduce vibrations of the 3D printer during operation thereof. The printer 10 features a horizontal base frame 12 composed of three rails 14A, 14B, 14C running in a horizontal Y-direction, and two cross bars 16A, 16B running in a horizontal X-direction of orthogonal relation to the Y-direction at opposing ends of the three rails 14A, 14B, 14C. The two outer rails 14A, 14B cooperate with the two cross bars 16A, 16B to define a rectangular box frame that is bisected by the center rails 14C situated midway between the two outer rails. This box frame defines a rectangular footprint of the 3D printer that is occupied thereby when seated atop a table, bench, countertop, floor or other suitable support surface. The printer 10 also includes an upright frame 18 composed of two vertical stanchions 20 standing perpendicularly upright from the outer rails 14A, 14B of the base frame 12 at an intermediate location between the cross bars 16A, 16B, and a cross-header 22 spanning horizontally between the two stanchions 20A, 20B at the top ends thereof, and cooperating therewith to define a rectangular shape to the upright frame 18.

A horizontally oriented build plate 24 onto which 3D objects are printed is movably supported on the center rail 14C of the base frame 12, and displaceable back and forth therealong in the horizontal Y-direction by a Y-axis motor 26 installed at one end of the center rail 14C. A movable cross-rail 28 spans horizontally between the two stanchions 20A, 20B, and has its opposing ends rollingly supported thereon for upward and downwardly displacement thereof by operation of an upright screw shaft 30 that neighbours one of the stanchions 20A, and is rotatably driven in opposing directions by a cooperating Z-axis motor 32 installed on the corresponding outer rail 14A from which that stanchion 20A stands upright. A nozzle head 34 is movably supported on the movable cross-rail 28, and displaceable back and forth thereon in the X-direction by an X-axis motor 36 mounted at one end of the movable cross-rail 28. An extruder 38 also mounted at the end of the movable cross-rail 28 is operable to feed printing filament to the nozzle head 34, where the filament is melted and ejected from the nozzle of the nozzle head 34 to build the 3D object onto the build plate 24. The illustrated printer 10 is just one non-limiting example of a 3D printer, and the present invention may just as well be used with other styles of 3D printers to reduce vibration thereof during printing operations performed thereby.

Figure 2:
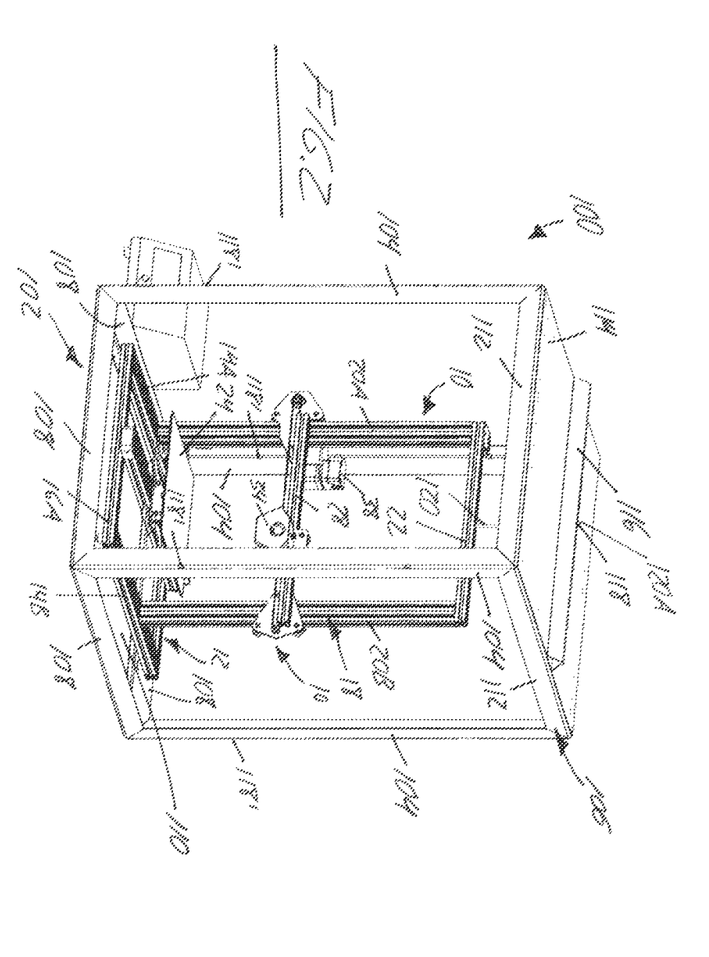
FIG. 2 is a front perspective view of a first embodiment stabilization apparatus of the present invention, in a working position thereof performing suspended support of the 3D printer from FIG. 1.
Figure 2A:
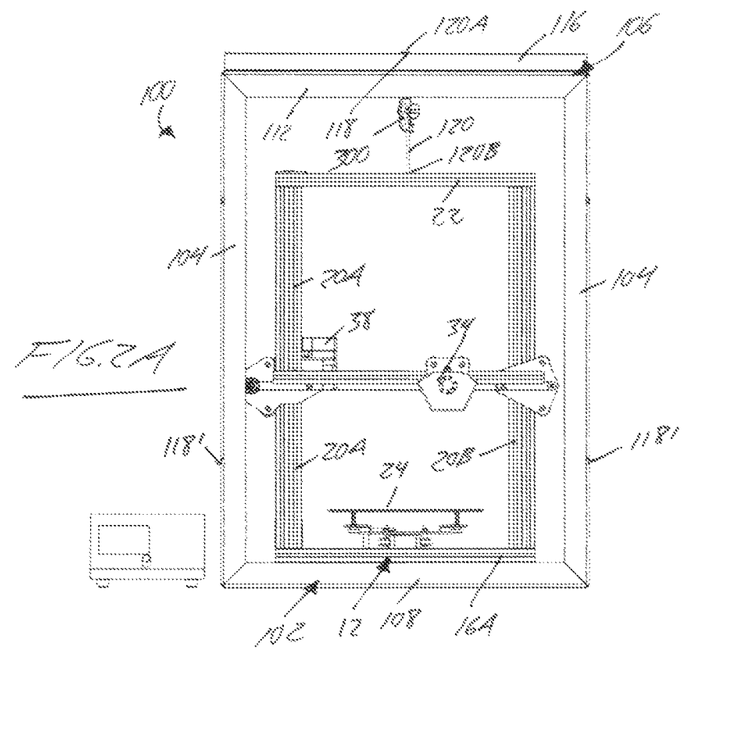
FIG. 2A is a front elevational view of the stabilization apparatus and 3D printer of FIG. 2.
Figure 2B:
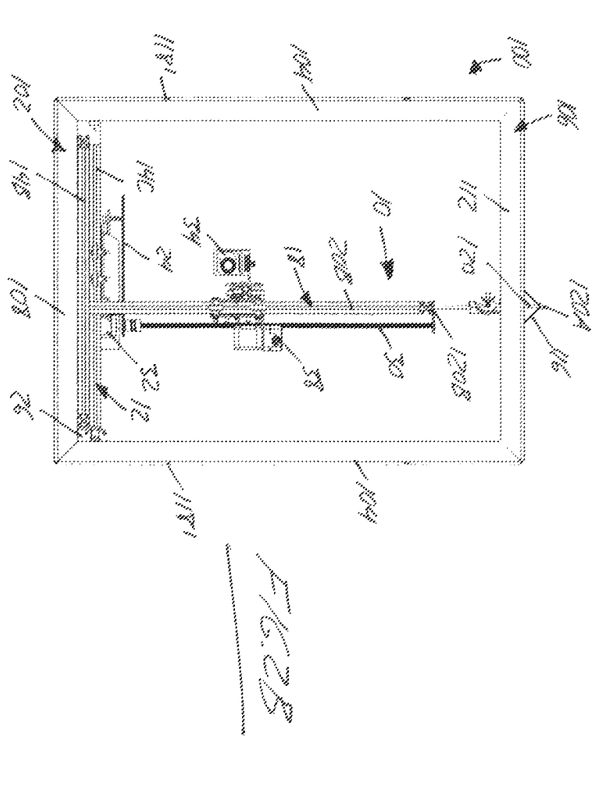
FIG. 2B is a side elevational view of the stabilization apparatus and 3D printer of FIG. 2.

Turning now to FIG. 2, shown therein is a first embodiment stabilization apparatus 100 of the present invention for reducing vibration of the 3D printer 10 during operation thereof. The apparatus 100 does so by suspending the 3D printer 10 in a floating position elevated off of an underlying support surface (table, bench, countertop, floor), atop which the 3D would otherwise normally be seated directly, and atop which a stationary framework of the apparatus 100 is instead seated during use of the illustrated embodiments of the present invention.

In this first embodiment, the stationary framework of the apparatus 100 has a horizontal base 102 of rectangular shape whose two-dimensional footprint exceeds that of the printer's base frame 12, a set of four uprights 104 standing vertically upright from the horizontal base 102 at the four corners thereof, and a top structure 106 mounted atop the four uprights 104 in elevated, parallel, and overlying relation to the horizontal base 102. The base 102 feature four perimeter framing members 108 connected end-to-end in perpendicular relationship to one another to define the rectangular shape of the base's outer perimeter, and may include a rectangular floor panel 110 affixed to the perimeter framing members 108 to occupy the rectangular space delimited thereby and thus form a closed bottom of the base 102, though the base may alternatively be of an open box frame construction, in which the rectangular space delimited by the framing members 108 is instead left open.

The top structure 106 features four peripheral framing members 112 each spanning horizontally and perpendicularly between a respective neighbouring pair of the uprights 104 at the top ends thereof in parallel and overlying relation to the perimeter framing members 108 of the base 102. In the illustrated example, the top structure 106 include a rectangular ceiling panel 114 affixed to the peripheral framing members 112 to occupy the rectangular space delimited thereby and thus form a closed ceiling of the framework, though the top structure 106 may alternatively be of an open box frame construction, in which the rectangular space delimited by the framing members 112 is instead left open. In the illustrated example, the top structure also features an upper cross-member 116 that is mounted atop the ceiling panel 114 and spans horizontally and perpendicularly between an opposing pair of the peripheral framing members 112 in parallel relation to the other two peripheral framing members at an intermediate location therebetween.

The cross-member 116 of the top structure 116 has a singular anchor point 118 thereon at a midpoint therealong, for example in the form of a drilled hole penetrating downwardly therethrough, for anchored receipt of a first end 120A of an elongated, flexible suspension cord 120. From this centrally located anchor point of the top structure 106 of the stabilization apparatus 100, and through an aligned hole in the ceiling panel 114 (if included), the flexible suspension cord 120 hangs downwardly into an interior working space of the stabilization apparatus 100 that is delimited horizontally between the four uprights 104 and vertically between the floor panel 110 and the ceiling panel 114 (or if the floor and ceiling panels are omitted, between the underlying support surface on which the base 102 is seated, and the underside of the top structure's cross-member 116). The 3D printer 110 is received within this interior space of the stabilization apparatus 100, and a second end 120B of the flexible suspension cord, situated longitudinally opposite of the anchored first end 120A thereof, is secured to the 3D printer 10 at a midpoint of the cross-header 22 thereof. An effective length of the suspension cord 120 is selected, or adjusted in the manner described below, so as not to exceed the difference between a height of the 3D printer (which in the illustrated example is measured from the underside of the base frame 12 to the topside of the cross-header 22) and the height of the interior space of the stabilization apparatus 100.

Accordingly, when secured to the second end 120B of the suspension cord 120 within the interior space of the stabilization apparatus 100, the 3D printer is hung in suspended fashion from the overhead top structure 106 of the stabilization apparatus, and thus resides in elevated and floating relationship to the floor 110 of the apparatus 100 and underlying support surface. Vibrations from operation of the 3D printer are at least partially absorbed by the suspension cord 120. While the illustrated example features only a singular anchor point 118 and singular suspension cord 120, by which the 3D printer is centrally suspended at a midpoint of the cross-header 22, a plurality of anchor points may alternative be distributed along the cross member 116 o the top structure to hang the 3D printer via a corresponding plurality of suspension cords secured to the printer's cross-header 22 at spaced apart positions therealong. Still referring to the first embodiment of FIG. 2, 118' is used to denote an alternative plurality of anchor points situated on the four uprights 104 of the stationary frame of the apparatus 100 at elevations thereon spaced above the base 102, the use of which is demonstrated in relation to the second embodiment.

Figure 3:
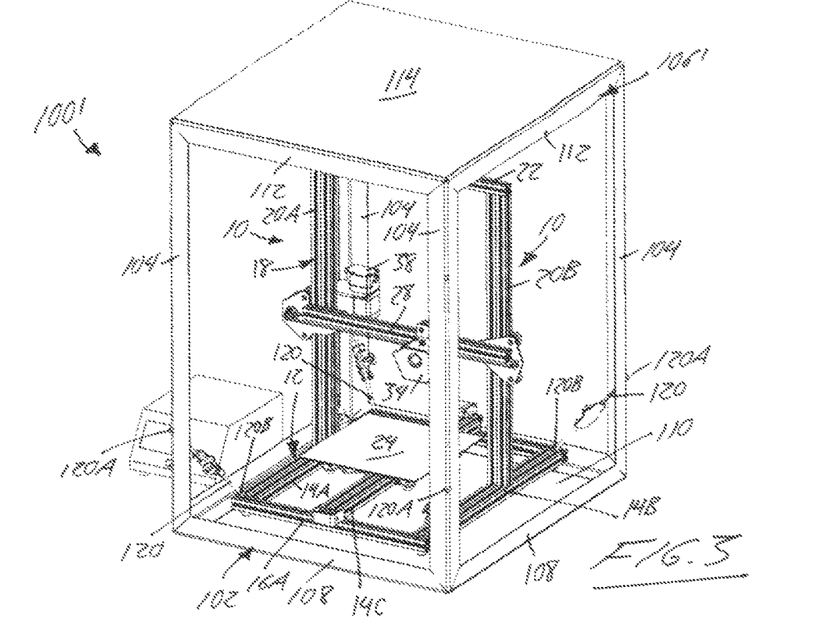
FIG. 3 is a front perspective view of a second embodiment stabilization apparatus of the present invention, in a working position thereof performing suspended support of the 3D printer from FIG. 1.
Figure 3A:
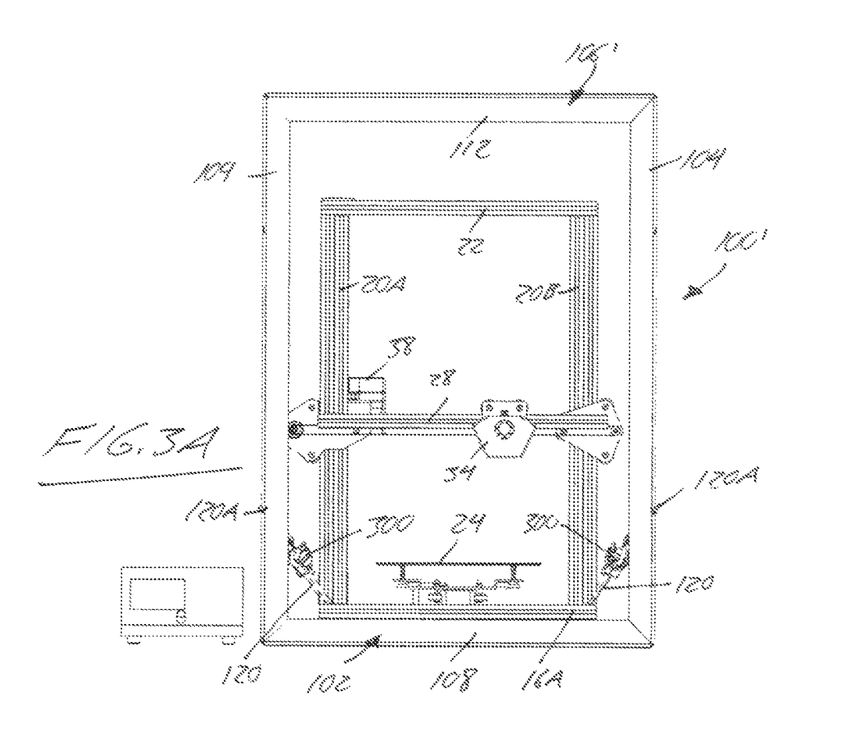
FIG. 3A is a front elevational view of the stabilization apparatus and 3D printer of FIG. 3.
Figure 3B:
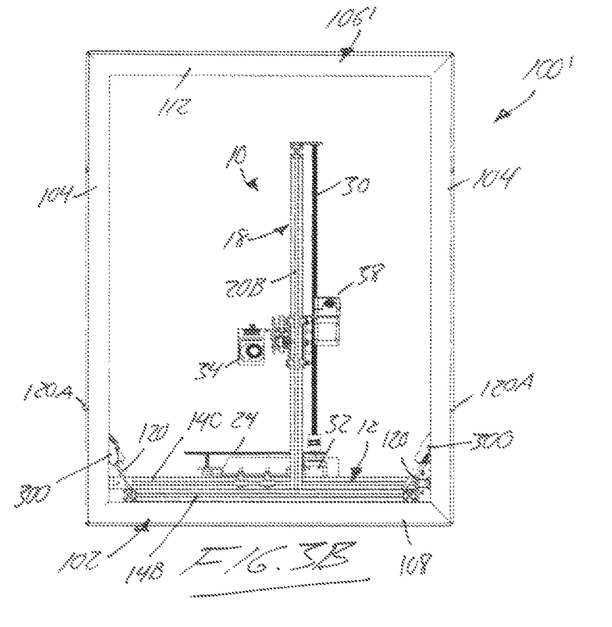
FIG. 3B is a side elevational view of the stabilization apparatus and 3D printer of FIG. 3.

Turning now to FIG. 3, the second embodiment of the stabilization apparatus 100' is shown therein, and features the same base 102 and uprights 104, and similar top structure 106' having the same peripheral framing members 112 and ceiling panel 114, but lacking the extra cross-member 116. The cross-member 116 of the top structure is omitted, as the second embodiment does not employ overhead suspension of the 3D printer from overhead of its cross-header 22 like the first embodiment, and thus lacks the need for structural reinforcement across the ceiling panel 114 to provide a solid overhead anchor point 118 like that of the first embodiment. It will be appreciated that even in the first embodiment of FIG. 2, the cross-member 116 may be omitted, with the overhead anchor point 118 instead provided directly in the ceiling panel 114, provided a suitably strong and rigid ceiling panel is employed to alone bear the suspended weight of the 3D printer 10.

In the second embodiment, a plurality of suspension cords 120 are used to suspend the 3D printer in a floating position within the interior space of the stabilization apparatus 100' in elevated relation to the base floor panel 110 (if included) and underlying support surface. The first end 120A of each suspension cord 120 is anchored to a respective one of the four anchor points 118' that are situated on the four uprights 104 at elevated locations over the four corners of the rectangular base 102, and the opposing second end 1208 of each suspension cord 120 is secured to the base frame 12 of the 3D printer at or near a respective one of the four corners thereof.

Figure 4:
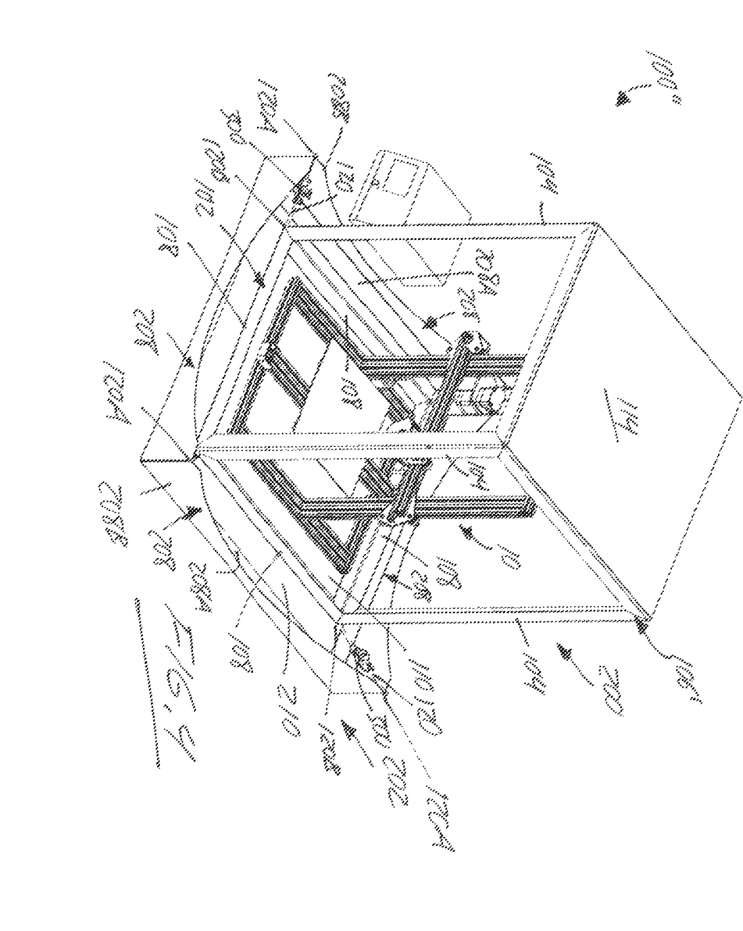
FIG. 4 is a front perspective view of a fourth embodiment stabilization apparatus of the present invention, in a working position thereof performing suspended support of the 3D printer from FIG. 1.
Figure 4A:
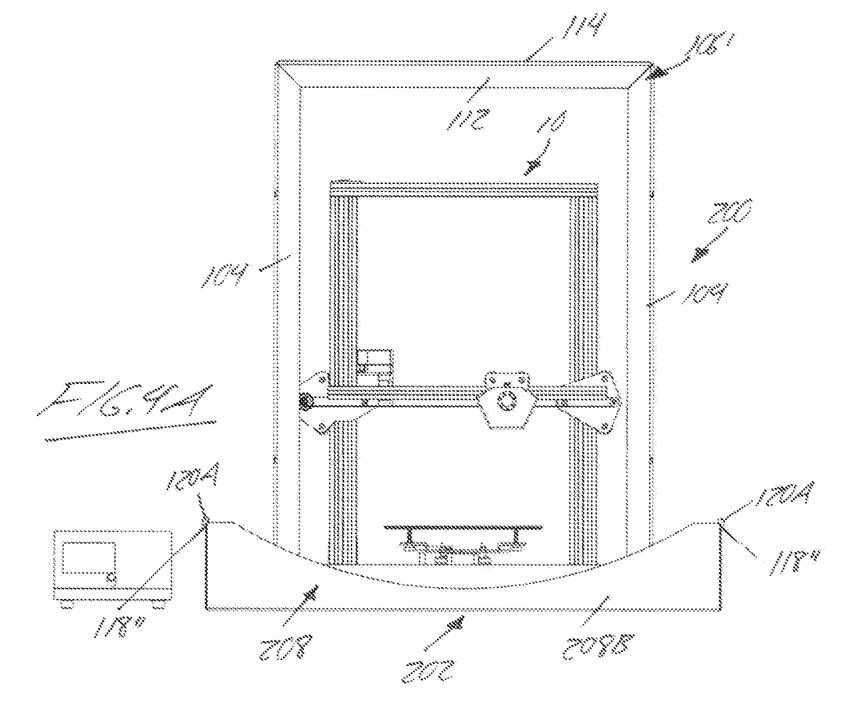
FIG. 4A is a front elevational view of the stabilization apparatus and 3D printer of FIG. 4.
Figure 4B:
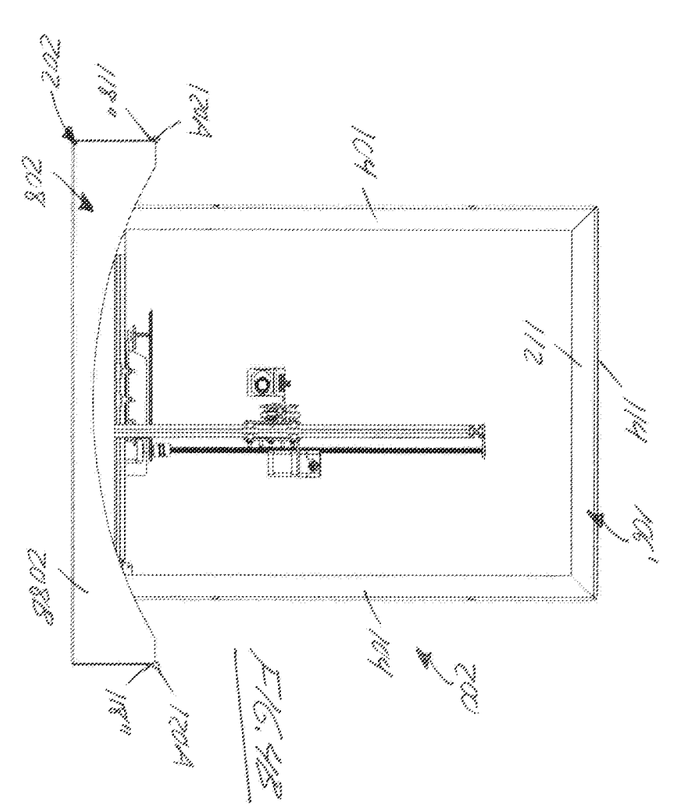
FIG. 4B is a side elevational view of the stabilization apparatus and 3D printer of FIG. 4.
Figure 4C:
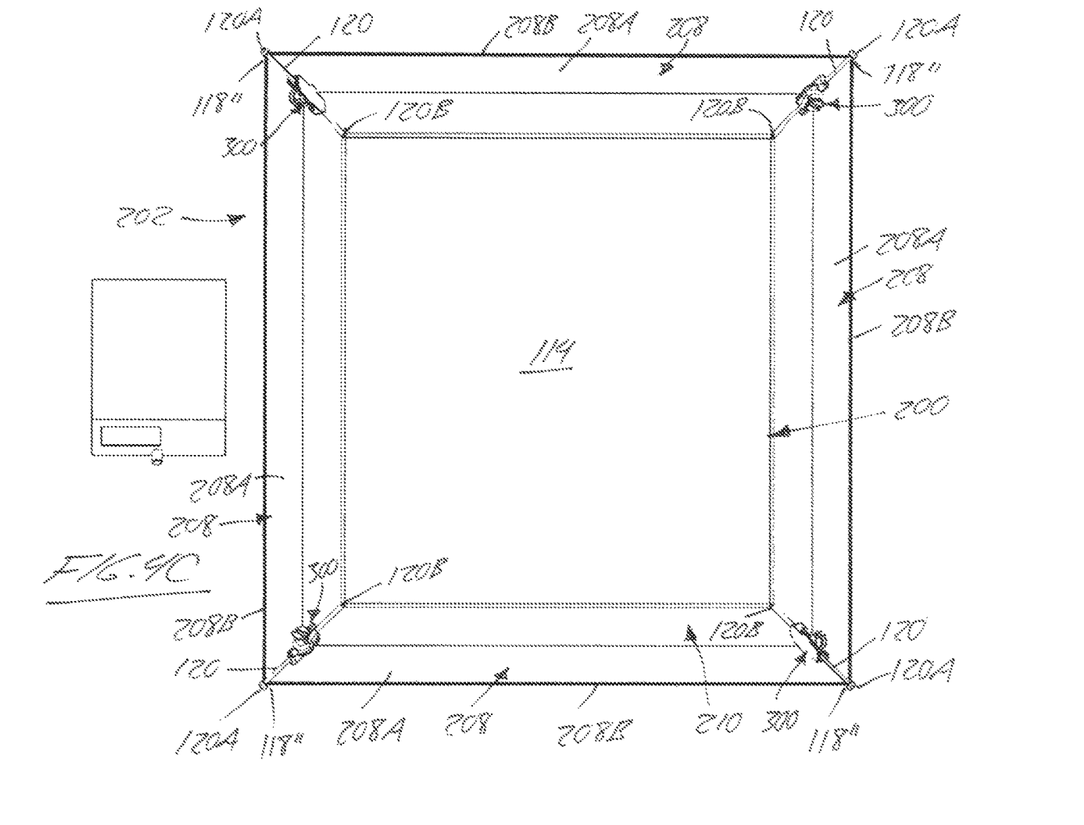
FIG. 4C is a plan view of the stabilization apparatus and 3D printer of FIG. 4.

FIG. 4 shows a third embodiment stabilization apparatus 100", where the identical framework (base 102, uprights 104, top structure 106') from the second embodiment, rather than serving as a stationary structure from which the 3D printer is suspended, instead serves as a floating support 200 that is suspended from a separate stationary framework 202 that is seated on the support surface in surrounding relation to the floating support 200. The floor panel 110 of the floating support 200 serves defines a platform 204 on which the base frame 12 of the 3D printer is seated, and this platform 204 is supported in floating relation to the surrounding stationary framework 202 by a set of suspension cords. While the floating support 200 in the illustrated example includes uprights 104 standing upward from the corners of the platform 204 and capped off with a top structure 106' whose ceiling panel 114 resides overhead of the 3D printer 10 in covering relationship thereto, it will be appreciated that the uprights 104 and top structure 106' could optionally be omitted in this embodiment, where the suspended platform 204 is sufficient to hold the 3D printer in seated fashion thereon.

The stationary framework 202 is a stationary rectangular base of similar construction to the box-frame of the floating base 102 of the floating support 200, being composed of four longer framing members 208 connected end-to-end in perpendicular relationship to one another to define a rectangular outer perimeter of this stationary base. These framing members 208 are longer than the framing members 108 of the floating support 200 so that the stationary rectangular base has a larger two-dimensional footprint than the floating base 102 of the floating support 200, and the longer framing members 208 can span externally around the floating support 200 in surrounding relation thereto. In the illustrated example, the stationary base formed by the four longer framing members 208 is an open box-frame, where the central area cooperatively delimited by the four framing members 208 is an open space 210, though a floor panel may optionally be attached to the framing members 208 to occupy this central area beneath the floating support 200.

Each framing member 208 of the stationary framework has a right-angle L-shape in cross-sectional planes that cut vertically through the framing member and lie normal (i.e. perpendicular) to the length thereof. The horizontal leg of the L-shape thus sits flat atop the underlying support surface on which the framing member is seated, while a vertical leg of the L-shape stands upright at the outer side of the horizontal leg, i.e. the side thereof furthest from the central opening 210 and the floating support 200 suspended thereover. The vertical leg of each framing member's L-shape thus forms an outer perimeter wall of the stationary base at a respective side of the central opening and the floating support. The overall two-dimensional footprint of the stationary base is thus measured between the vertical legs of an opposing pair of the framing members 208, i.e. between an opposing pair of the outer perimeter walls of the stationary base. In the illustrated example, each outer perimeter wall is off non-uniform height over the length of the framing member, and has a concavely arced top edge whose arc is centered along the length of the framing member and symmetric across the lengthwise midpoint of the framing member. Each outer perimeter wall is thus shortest at its midpoint, and gradually increases in height toward the two opposing ends of the perimeter wall. This need not be the case however, and each perimeter wall could be of rectangular shape of uniform height throughout.

In the illustrated example, four suspension cords 120 are used to suspend the floating support 200 relative to the stationary framework 202, and the anchor points 118" for the first ends 120A of the four suspension cords 120 reside at the four corners thereof where the frame members 208 meet, and more particularly reside on the upright outer perimeter walls at the taller corner-adjacent areas thereof so that the anchor points reside in elevated relation above the horizontal legs of the frame members that define the underside of the base that's seated on the underlying support surface. The second end 120B of each suspension cord is secured to the floating base 102 at the respective corner thereof where two of the floating base's framing members 108 meet. Alternatively, in the illustrated example where the floating support 200 includes an upright 104 at each corner of the floating base 102, the second ends 120B of the suspension cords 120 may alternatively be secured to the uprights 104.

So whereas the first two embodiments had the 3D printer directly suspended on a stationary framework by way of one or more suspension cords 120, the third embodiment has the 3D printer indirectly suspended on a stationary framework 202 by seated receipt of the 3D printer on a floating support 200 that in-turn is suspended on a surrounding stationary framework whose two-dimensional footprint exceeds that of both the 3D printer, and the floating support 200 on which the 3D printer is seated. In any case, the result is that the 3D printer is supported in floating fashion above the support surface on which the stationary framework is seated, and vibration generated by operation of the 3D printer is at least partially absorbed by the flexible suspension cords 120 that provide this direct or indirect floating support of the 3D printer.

Figure 5:
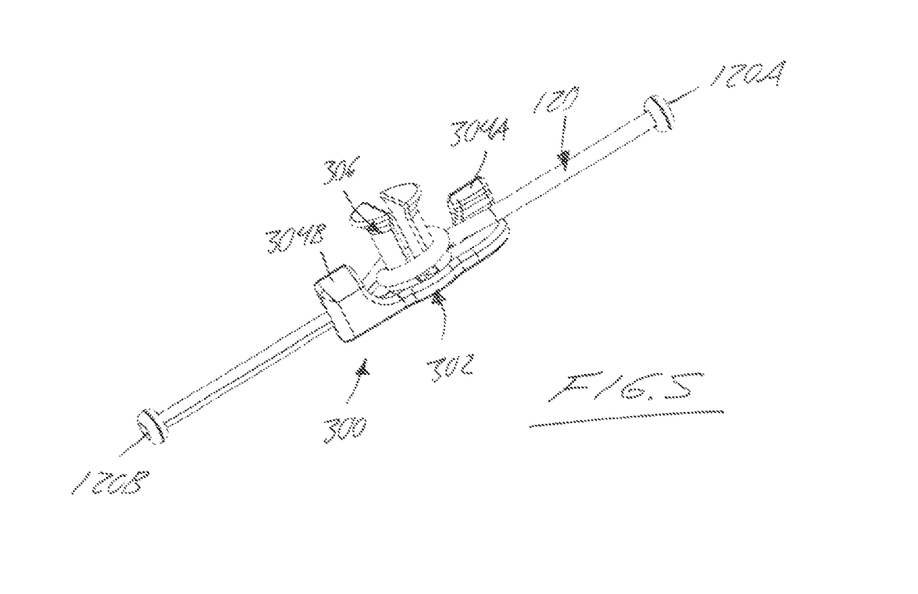
FIG. 5 is an isolated perspective view of an adjustable suspension unit used in the stabilization apparatuses of FIGS. 2 through 4.

FIG. 5 shows, in isolation, one of the suspension cords 120 used in the forgoing embodiments, which is made adjustable by accompaniment thereof with a length/tension adjustor 300. The illustrated example of this adjustor 300 is a single piece component having a singular unitary body 302 a pair of cord-routing guides 304A, 304B situated at opposing ends of the body on a same side thereof. Also on that same side of the body 302 is a split-post 306 situated intermediately between the inlet and outlet guides. To assemble the cord 120 a central segment of the cord 120 is wrapped around the split-post 306, and the two remaining segments of the cord that extend from opposing ends of this post-wrapped central segment are respectively passed through the two routing guides 304A, 30B to extend from opposing ends of the adjuster.

By selecting how many times the cord 120 is wrapped around the post 306, the effective length of the cord measured linearly between its two ends 120A, 120B is adjusted. In the first embodiment, such length adjustment of the cord is useful to set a suitable hanging distance of the cord 120 from the top structure 106 of the framework according to the height of the particular 3D printer concerned. In the second and third embodiments, instead of hanging straight down to suspend the 3D printer from directly overhead like in the first embodiment, the suspension cords angle inward from their respective anchor points on the stationary framework to connect to the 3D printer or floating support, and so the length adjustment of the suspension cords via their respective adjustors 300 can be used to adjust the amount of cord tension in the suspended support of the 3D printer.

While the illustrated embodiments employ cords 120 (e.g. parachute cord), with optional length/tension adjustors 300, as flexible suspenders for directly or indirectly suspending the 3D printer in its floating state, it will be appreciated that other flexible componentry may be substituted therefor, such as chain, rope, zip ties, etc. The manner in which the ends of the flexible suspenders are secured to the anchor points of the stationary framework and to securement points on the 3D printer or floating support may also vary. The drawings schematically illustrate a respective enlargement at each end 120A, 120B of each suspension cord 120, which may be formed by a respective knot tied in the cord itself, or by a separate component secured or affixed to the cord in any available fashion.

FIG. 2 shows anchor points 118' as simple round holes in the framework, through the first end 120A of the cord is passed outwardly from the framework before attachment or formation of an enlargement on that first end, though a keyslot-shaped holes may alternative be employed, where a widened top end of the hole is a broad enough to enable passage of the first end's enlargement therethrough during installation of a cord, before pulling the cord down into a narrowed lower neck of the hole through which passage of the first end enlargement is blocked. The cord is thereby anchored such that the loaded weight of the 3D printer cannot pull the cord out of the keyslot hole in the stationary framework. In the third embodiment, an open-topped slot may reside at each corner of the stationary framework 202 for similar purpose of accommodating insertion of the cord into the slot, and subsequently blocking pulling of the cord's first end enlargement back through the slot. These are non-limiting examples, and the first ends of the cords or other suspenders may be anchored to the stationary framework in any suitable manner, just as the second ends of the cords or other suspenders may be secured to the 3D printer or floating support in any suitable fashion.

Furthermore, while the illustrated embodiments provide a dedicated stationary framework placeable atop any suitable support surface to form a structure from which the 3D printer can be directly or indirectly suspended in a floating position above that support surface, it will be appreciated that the same methodology of directly or indirectly suspending the 3D printer in such a floating state to absorb vibration during operation of the printer may also be applied in scenarios using existing stationary structures available in the printer's particular environment of use.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. In combination, a 3D printer and a stabilization apparatus for reducing vibration of said 3D printer during operation thereof atop a support surface, wherein said stabilization apparatus comprises:
    a stationary framework comprising a base placeable in a working position seated atop said support surface and having a greater two-dimensional footprint than said 3D printer, whereby, in said position, an outer perimeter of said base of the stabilization apparatus resides in surrounding relation around the two-dimensional footprint of said 3D printer; and
    one or more flexible suspenders each having an elongated shape between longitudinally opposing first and second ends thereof;
    one or more anchor points each associated with a respective one of the one or more flexible suspenders and each defined on the stationary framework at a respective location of elevated relation to an underside of the base, each of said one or more anchor points holding the first end of said respective one of the one or more flexible suspenders to thereby anchor said respective one of the one or more flexible suspenders to the stationary framework;
    wherein the second end of said respective one of the one or more flexible suspenders is secured either to the 3D printer, or to a floating support of the stabilization apparatus atop which the 3D printer is seated, at a lesser elevation than the anchor point at which the first end of said respective one of the one or more flexible suspenders is held to the stationary framework, and wherein the 3D printer is supported solely by the one or more flexible suspenders and in a state of both floating and suspended relation to the stationary framework, and a weight of said 3D printer exerts tension on each of said one or more flexible suspenders.

2. The combination of claim 1 wherein said stationary framework comprises a set of uprights standing upward from the base at discretely spaced positions from one another, between which the stationary framework is open to enable access to the 3D printer.

3. The combination of claim 2 wherein said uprights reach upwardly to an elevation that exceeds a height of the 3D printer.

4. The combination of claim 2 wherein said one or more flexible suspenders comprises a plurality of flexible suspenders, and the one or more anchor points of the stationary framework comprise a plurality of anchor points respectively disposed on the uprights of said stationary framework.

5. The combination of claim 2 wherein the uprights stand upward form the base at respective corners thereof.

6. The combination of claim 3 wherein the uprights are interconnected at top ends thereof by an overhead portion of the stationary framework, each of the one or more anchor points of the stationary framework are found at said overhead portion thereof for suspended and floating support of the 3D printer solely from thereabove.

7. The combination of claim 1 wherein the base of the stationary framework comprises a set of frame members interconnected or interconnectable end to end with one another and delimiting an open space between them, over which the 3D printer is supported or supportable in said suspended relation to the stationary framework.

8. The combination of claim 1 wherein the one or more anchor points comprise a plurality of anchor points residing at respective corners of the stationary framework.

9. The combination of claim 7 wherein the one or more anchor points comprise a plurality of anchor points residing at respective corners of the base where said frame members are interconnected end-to-end with one another.

10. The combination of claim 1 wherein the stabilization apparatus includes said floating support to which the second end of each flexible suspender is secured.

11. The combination of claim 10 wherein said floating support comprises a support platform on which the 3D printer is seated.

12. The combination of claim 1 wherein each flexible suspender comprises a flexible cord.

13. The combination of 12 wherein each flexible suspender further comprises a cord adjuster operable to adjust a length of said flexible cord.

14. A method of using the combination of claim 1 comprising reducing vibration of the 3D printer during operation thereof, said method comprising supporting said 3D printer in said state of both floating and suspended relation to the stationary framework solely by suspended hanging of the 3D printer or the floating support by said one or more flexible suspenders.

15. The combination of claim 1 wherein each anchor point comprises a hole or slot through which the respective one of the one or more flexible suspenders passes, and said respective one of the one or more flexible suspenders comprises a respective enlargement on an end thereof outside said hole or slot to block pulling of said respective one of the one or more flexible suspenders from said slot.

16. The combination of claim 4 wherein said plurality of anchor points reside at lesser elevation than top ends of the respective corner uprights.

17. The apparatus of claim 4 wherein the uprights stand upright frame the base at respective corners thereof.

18. The combination of claim 1 wherein each of said one or more flexible suspenders comprises a zip tie.

19. The combination of claim 13 wherein adjuster comprises a wrapping post about arranged for selecting wrapping of the cord by a variably selective number of times to vary an effective length of the cord between the first and second ends.

20. A stabilization apparatus for reducing vibration of a 3D printer during operation thereof atop a support surface, wherein said stabilization apparatus comprises:
a stationary framework comprising a base placeable in a working position seated atop said support surface and spanning a greater two-dimensional footprint than said 3D printer, whereby, in said working position, an outer perimeter of said base of the stabilization apparatus resides in surrounding relation around the two-dimensional footprint of said 3D printer; and
one or more flexible suspenders each having an elongated shape between longitudinally opposing first and second ends thereof; and
one or more anchor points each associated with a respective one of the one or more flexible suspenders and each defined on the stationary framework at a respective location of elevated relation to an underside of the base, each of said one or more anchor points holding the first end of said respective one of the one or more flexible suspenders to thereby anchor said respective one of the one or more flexible suspenders to the stationary framework;
wherein the second end of said respective one of the one or more flexible suspenders is secured to a floating support of the stabilization apparatus atop which the 3D printer is placed or placeable, at a lesser elevation than the anchor point at which the first end of said respective one of the one or more flexible suspenders is held to the stationary framework, and wherein the floating support is supported solely by the one or more flexible suspenders and in a state of both suspended and floating relation to the stationary framework of the stabilization apparatus in a manner that tensions each of said one or more flexible suspenders under a weight of the 3D printer when placed on said floating support.

* * * * *